Sept. 30, 1947.      A. E. SIDNELL      2,428,127
RUBBER ARTICLE AND PROCESS AND FORM FOR MAKING SAME
Original Filed Sept. 26, 1940    2 Sheets-Sheet 1
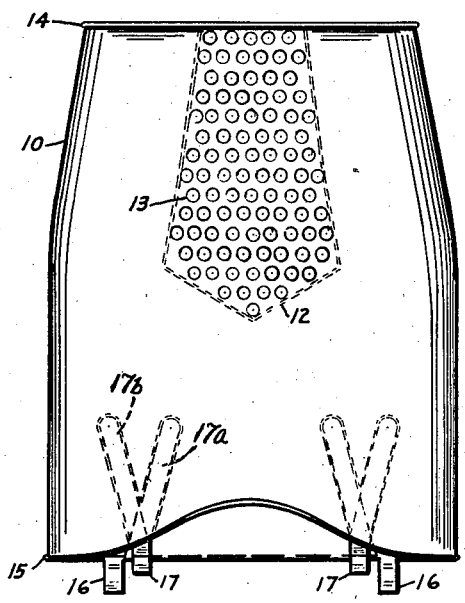
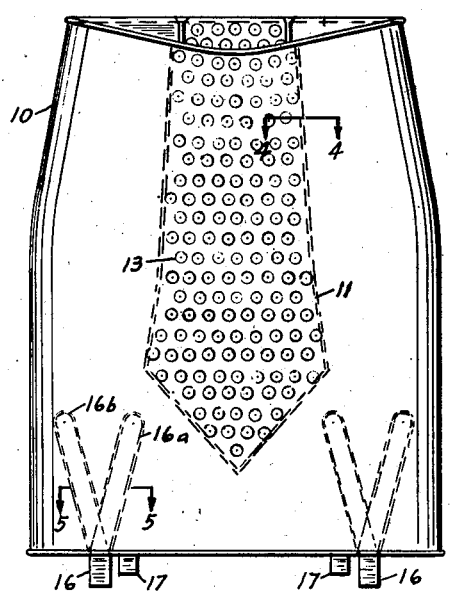
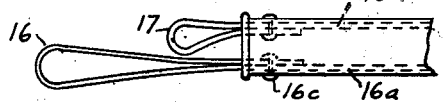
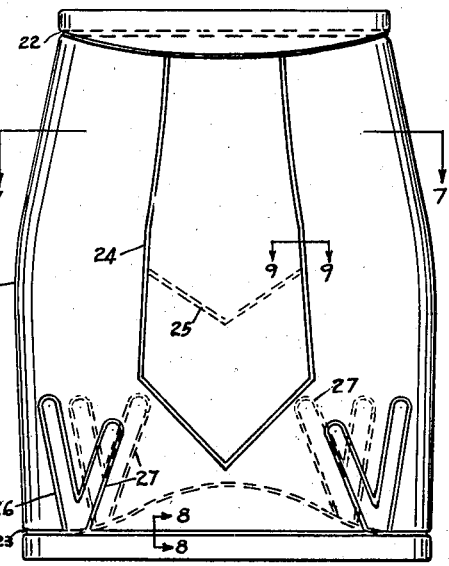
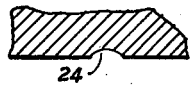
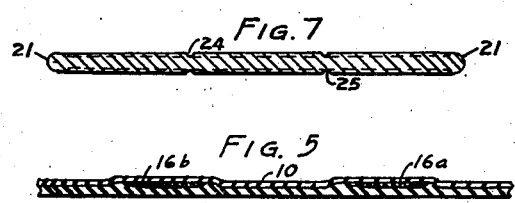
INVENTOR:
ALBERT E. SIDNELL
BY *Jordon C. Mack*
ATTORNEY Sept. 30, 1947.   A. E. SIDNELL   2,428,127
RUBBER ARTICLE AND PROCESS AND FORM FOR MAKING SAME
Original Filed Sept. 26, 1940   2 Sheets-Sheet 2

INVENTOR:
ALBERT E. SIDNELL
BY
ATTORNEY

Patented Sept. 30, 1947

2,428,127

UNITED STATES PATENT OFFICE 2,428,127

RUBBER ARTICLE AND PROCESS AND FORM FOR MAKING SAME

Albert E. Sidnell, Akron, Ohio

Continuation of application Serial No. 358,407, September 26, 1940. This application filed January 11, 1945, Serial No. 572,383

14 Claims. (Cl. 2—43)

This invention relates to rubber articles or the like and particularly to articles made of rubber and like materials by deposition or dipping processes, including inserts, perforations, etc.

Heretofore, rubber or like girdles for women have been made by deposition, dipping or like processes of applying rubber to a form; but these have not been entirely satisfactory in that when not perforated for ventilation, they are uncomfortable, and when perforated for this purpose, are easily torn. Also, no suitable way has been provided for attaching hose supporters thereto, the plain rubber girdle being unsuitable for securing hose supporters.

One purpose of the invention is to provide an improved form and method for making deposited rubber articles with reinforcements or attachments and for an article resulting from the use of said form and method.

The present invention has for its specific objects the provision of a form on which the rubber may be deposited for making an improved woman's girdle with reinforcing inserts and attachments, an improved method of making a deposited rubber girdle perforated for ventilation, and a method for effectively securing means to the girdle for attachment of hose supporters.

Another purpose of the invention is to provide an improved dipped rubber girdle or like garment having strips of elastic or resilient reinforcing material embedded in the edge portions thereof during the deposition process, whereby the garment will not tear at the edge portions when stretched, as, for example, to fit the wearer.

The foregoing and other purposes and objects are obtained by the form, the method, and article illustrated in the accompanying drawings and described below. It is understood that the invention is not limited to the specific form thereof shown and described.

Of the accompanying drawings:

Fig. 1 is a back view of a woman's girdle embodying the invention;

Fig. 2 is a front view thereof;

Fig. 3 is a fragmentary side elevation thereof showing the loops provided for attachment of hose supporters;

Fig. 4 is a section along line 4—4 of Fig. 2;

Fig. 5 is a section along line 5—5 of Fig. 2;

Fig. 6 is a front elevation of a form embodying and adapted to carry out the invention;

Fig. 7 is a section on line 7—7 of Fig. 6;

Fig. 8 is a fragmentary section on line 8—8 of Fig. 6;

Fig. 9 is a fragmentary section on line 9—9 of Fig. 6;

Figure 10:
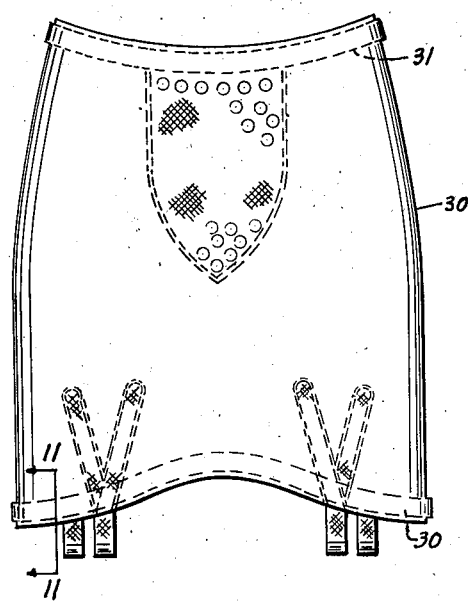
Fig. 10 is a view similar to Fig. 1, of a modified form of the invention.

Referring particularly to Figs. 1–9 of the drawings, the improved girdle comprises a body portion 10 which consists of a plurality of layers (at least two) of deposited rubber. Arranged between the layers, preferably at both the front and back portions of the garment, is a layer of suitable, preferably comparatively light, fabric or other reinforcing material adapted to the purpose, as indicated at 11 and 12, respectively. The garment may be perforated through the reinforced portions 11 and 12, as indicated at 13, to provide effective ventilation, the perforated portions being reinforced, of course, to prevent tearing thereof.

The area and shape or design of these fabric inserts may be varied as desired but extend less than the entire distance around the girdle so that unreinforced, imperforate portions thereof may stretch as required to be applied to and fit about the body of the wearer.

The top and bottom edges of the girdle may be reinforced by ribs or beads 14 and 15, respectively, formed on the garment to resist tearing thereof. At the bottom of the garment there are arranged loops 16, 16 and 17, 17 for attachment of suitable hose supporters (not shown) to the garment. These loops may comprise rubber covered fabric or other suitable reinforcing or stretch-resisting material and may be formed of strips of this material extended between layers of the deposited rubber forming the body 10 of the garment, one of said strips indicated at 16a extending out from the lower edge of the garment and the other indicated at 16b extending down to and terminating at the lower edge of the garment, the strip 16a being looped back and secured to the garment in any suitable way, as by rivets 16c, sewing or otherwise, and either before or after the outer layer of rubber has been applied by deposition to form the garment. It will be understood that each of the loops 16 and 17 may be similarly secured to the garment so that description of one of the loops 16 with reference to Figs. 1, 2, and 3 is sufficient to understand the construction of all, the parts 17a and 17b of Figs. 1 and 3 corresponding to the parts 16a and 16b.

The improved garment may be made on the form shown in Fig. 6. This form may be a comparatively flat plate 20 with rounded side edges 21, 21 and of the shape and size to form the desired shape and size of a girdle. Adjacent its upper edge the form may be provided with a groove indicated at 22 into which the rubber deposited on the form may flow to form the bead 14; and, similarly, adjacent the bottom edge of the form there may be a groove 23 into which the rubber deposited on the form can collect to form the rib or bead 15. The form is also preferably provided with slight shallow grooves 24 and 25 for outlining the positions of the fabric inserts 11 and 12, as will be explained, and also with similar slight grooves, as indicated at 26, 26 and 27, 27, for outlining the positions of the hose-supporting insert strips, such as 16a and 16b. Grooves such as 22 or 23 are indicated in Fig. 8, and such as 24 are indicated in Fig. 9.

In carrying out the improved method to make the article shown and with the use of the form 20 which has just been described, this form may be dipped one or more times in rubber cement, latex or artificial or synthetic rubber solutions or dispersions; or the rubber or like materials may be deposited on the form by spraying, electro-deposition or otherwise to provide an inner coating of rubber on the form. At the places where the grooves 24, 25, 26, and 27 are provided, there will be slight grooves in the outer surface of the inner coating of rubber, outlining the portions of the fabric inserts. The fabric inserts are then placed on the inner layer of rubber, while it is in a tacky condition, in their correct positions within the grooved outlines provided so that the inserts will adhere to the inner layer of rubber. Then the form 20 is again dipped one or more times in the rubber or like solutions or depositions of rubber or the like, or such solutions are otherwise applied on the form to provide an outer layer of rubber, whereby the fabric inserts are secured between the inner and outer layers of rubber.

After the rubber has been dried or cured or vulcanized on the form, the resulting article is stripped from the form and is trimmed to the beads 14 and 15 at the top and bottom thereof, respectively. The loops 14 may be secured either before or after the second dipping of rubber; and if afterwards, the extending portions of the strips may be looped up and secured by rivets, sewing or otherwise.

Either before or after trimming or before or after securing the loops, the resulting article may be perforated, as by a suitable punch device, providing ventilating openings indicated at 13 through the reinforced portions 11 or 12 of the garment, the reinforcing fabric effectively preventing these portions of the garment from being so weakened by the perforations as to tear easily.

Figure 11:
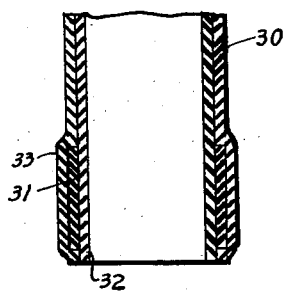
Fig. 11 is a cross section, on an enlarged scale, taken on line 11—11 of Fig. 10.

In Figs. 10 and 11 are shown a modified form of girdle 30, similar to the girdle shown in Figs. 1-9 in all respects except that instead of the reinforcing ribs 14 and 15 formed by deposition of rubber on the girdle form, strips or bands 31, 31 of elastic or resilient material, such as gum rubber, are incorporated into the top and bottom edge portions of the girdle. As described above in connection with the method of applying the fabric inserts to girdle 10, the gum rubber strips 31 may be placed on the inner layer 32 of rubber around the edge portions of the top and bottom openings of the girdle 30, and then the form may be dipped one or more times in latex or like solutions or depositions of rubber to provide an outer layer 33 of rubber. In vulcanization of the article thus formed, the strips 31 become integrally bonded between the inner and outer layers of the garment rubber.

This construction provides strong reinforced edges on the garment to prevent the same from tearing when the garment is stretched onto or removed from the body of the wearer or when the edge portions are pulled for any reason, such as to adjust the girdle for greater comfort on the wearer or to adjust the hose supporters (not shown).

It will be apparent from the foregoing that an improved article of deposited rubber has been provided by the invention and, also, an improved form and procedure for producing such articles simply and economically. It is to be understood that modifications of the invention and adaptations thereof to other articles may be resorted to without departing from the spirit thereof or the scope of the appended claims.

This application is a continuation of my application Serial No. 358,407, filed September 26, 1940.

What I claim is:

1. A girdle which shapes itself to the body of the wearer and which comprises inner and outer layers of deposited rubber and inserts of reinforcing material secured therebetween during the process of deposition of the rubber, one of the inserts being located in the front of the girdle and the other insert being located in the back of the girdle, the respective inserts being substantially symmetrical and covering substantial areas on both sides of the center lines of the front and back of the girdle, said reinforced portions of the girdle being perforated to provide ventilation, there being imperforate, elastic, unreinforced areas of deposited rubber at the sides of the girdle which are composed of said inner and outer layers united in face-to-face relation without any interface.

2. A girdle which shapes itself to the body of the wearer and which comprises inner and outer layers of deposited rubber and inserts of reinforcing material secured therebetween during the process of deposition of the rubber, one of the inserts being located in the front of the girdle and the other insert being located in the back of the girdle, the respective inserts being substantially symmetrical and covering substantial areas on both sides of the center lines of the front and back of the girdle, said reinforced portions of the girdle being perforated to provide ventilation without any additional reinforcement at said perforations than is provided by reinforcing material, and circumferentially between the inserts imperforate, elastic, unreinforced areas of deposited rubber at the sides of the girdle composed of said inner and outer layers united in face-to-face relation without any interface.

3. A girdle comprising inner and outer layers of deposited rubber having one or more inserts of inelastic reinforcing material secured therebetween during the process of deposition of the rubber, the insert or inserts being discontinuous about the garment, whereby portions of the garment which are not thus reinforced may freely stretch so that the garment may be applied to and shape itself to the body of the wearer, said reinforced portion or portions of the girdle being perforated to provide ventilation.

4. A girdle comprising inner and outer layers of deposited rubber having one or more inserts of inelastic reinforcing material secured therebetween during the process of deposition of the rubber, the insert or inserts being discontinuous about the garment, whereby portions of the garment which are not thus reinforced may freely stretch so that the garment may be applied to and shape itself to the body of the wearer, said reinforced portion or portions of the girdle being perforated to provide ventilation without any additional reinforcement at the perforations than is provided by the inelastic reinforcing material.

5. A girdle comprising a body portion composed of layers of deposited rubber, and secured to the body portion stretch-resisting hose-supporter connections a portion of each of which is secured between the layers of the body portion during the process of deposition, and another portion of which extends from the lower edge of the girdle so that hose supporters may be attached thereto below the body portion of the girdle.

6. A method of making girdles with stretch-resisting, reinforcing cloth inserts which comprises providing a form having thereon a formation which defines the outline of an insert, depositing a layer of rubber or the like on said form over the formation defining the outline of the insert thereby producing an irregularity in the surface of the deposited rubber which defines the outline of the insert, placing a stretch-resisting cloth insert on the rubber-covered form in the position so outlined, and depositing a further layer of rubber over the aforesaid layer and over the insert to secure the insert between the layers of rubber.

7. A method of making a girdle with an insert which reinforces a portion of the girdle which is to be perforated to provide ventilation, which comprises providing a form for a girdle with a formation thereon which defines the position of the reinforcing insert, depositing a layer of rubber or the like on said form over the formation defining the position of the insert thereby producing an irregularity in the surface of the deposited rubber which defines the position of the insert, placing the insert on the form in the position thus defined, and then depositing a further layer of rubber over the previously deposited rubber and over the insert to secure the insert between the layers of rubber.

8. A method of making a girdle with hose-supporter connections extending from the lower edge thereof which comprises providing a form having formations at the lower edge thereof which define the positions of a portion of each of the hose-supporter connections, depositing a layer of rubber on the form and over the formations thereby producing in the surface of the rubber deposit irregularities which define the locations for the hose-supporter connections, placing the hose-supporter connections on the deposited layer of rubber in the locations defined by said irregularities with a portion of each extending from the edge of the form, and then depositing a further layer of rubber over the original layer of rubber and of rubber over the original layer of rubber and the portion of each hose-supporter connection on the form so as to secure said portions between the layers of rubber while leaving an uncoated portion of each hose-supporter connection extending from the edge of the form.

9. A form for a girdle of deposited rubber with an insert for reinforcing portions in the front and back thereof for subsequent perforation for ventilation, which form has on the surface thereof a formation which when covered with a layer of deposited rubber, outlines the locations for said inserts in the front and back of the girdle.

10. A form for a girdle of deposited rubber with hose-supporter connections one portion of each of which is held between layers of the deposited rubber and another portion of each of which extends below the girdle, which form comprises formations which when covered with a layer of rubber, produce irregularities which define the locations for the hose-supporter connections which are to be laid thereon for subsequent deposition of a further layer of rubber over the hose-supporter connections and the rubber already deposited on the form.

11. A form for a girdle of deposited rubber with an insert for reinforcing portions in the front and back thereof for subsequent perforation or ventilation, which form has therein a groove or other depression for outlining the position of an insert on the front and back thereof whereby when a layer of rubber is applied to the form, the location for the insert will be defined by a depression in the front and back surfaces of said layer.

12. A rubber girdle, the inner and outer surfaces of which are of deposited rubber, there being perforations concentrated in areas at the front and back of the girdle, said areas being reinforced by a thin fabric interposed between said deposited rubber surfaces, there being areas of the girdle which are imperforate, unreinforced, and composed entirely of deposited rubber.

13. The method of making a girdle which comprises depositing rubber from latex on a girdle form, placing at least one reinforcing insert on the deposited rubber, then depositing rubber from latex on the exposed surfaces of (1) the one or more inserts and (2) the first-mentioned deposited rubber, and then perforating the girdle thus formed in the reinforced areas.

14. The method of making a girdle which comprises depositing rubber from latex on a girdle form, placing a thin fabric insert on the deposited rubber at the front and back of the girdle, there being exposed areas of the deposited rubber between the inserts, then depositing more rubber from latex over the inserts and said exposed areas, and then perforating the girdle through the inserts to provide ventilation.

ALBERT E. SIDNELL.

REFERENCES CITED

The following references are of record in the file of this patent:

UNITED STATES PATENTS

| Number | Name | Date |
| --- | --- | --- |
| 1,729,502 | Charnaux | Sept. 24, 1929 |
| 1,867,881 | Crockett | July 19, 1932 |
| 2,033,065 | Galligan | Mar. 3, 1936 |
| 2,119,496 | Spanel | May 31, 1938 |
| 2,119,499 | Spanel | May 31, 1938 |
| 2,120,817 | Simon | June 14, 1938 |
| 2,259,488 | Raiche | Oct. 21, 1941 |
| 2,330,330 | Beal et al. | Sept. 28, 1943 |
| 2,360,736 | Spanel | Oct. 17, 1944 |

FOREIGN PATENTS

| Number | Country | Date |
| --- | --- | --- |
| 818,430 | France | June 14, 1937 |